(12) United States Patent
Hanson

(10) Patent No.: US 10,216,300 B2
(45) Date of Patent: Feb. 26, 2019

(54) HUMAN-COMPUTER INTERFACE DEVICE AND SYSTEM

(71) Applicants: Spring Power Holdings Limited, Hong Kong (HK); David Hanson, Hong Kong (HK)

(72) Inventor: David Hanson, Hong Kong (HK)

(73) Assignees: Spring Power Holdings Limited, Hong Kong (HK); David Hanson, Hong Kong (HK)

( * ) Notice: Subject to any disclaimer, the term of this patent is extended or adjusted under 35 U.S.C. 154(b) by 58 days.

(21) Appl. No.: 15/508,116

(22) PCT Filed: Jul. 31, 2015

(86) PCT No.: PCT/CN2015/085784
§ 371 (c)(1),
(2) Date: Mar. 2, 2017

(87) PCT Pub. No.: WO2016/034026
PCT Pub. Date: Mar. 10, 2016

(65) Prior Publication Data
US 2017/0242504 A1 Aug. 24, 2017

(30) Foreign Application Priority Data

Sep. 2, 2014 (HK) .................................. 14108917

(51) Int. Cl.
*G06F 3/041* (2006.01)
*G06F 3/0488* (2013.01)
(Continued)

(52) U.S. Cl.
CPC .............. *G06F 3/041* (2013.01); *A63F 13/20* (2014.09); *A63F 13/213* (2014.09);
(Continued)

(58) Field of Classification Search
CPC .. G06F 3/041; G06F 3/04883; G06F 3/03543; G06F 3/03545; G06T 13/00; G06T 13/40
See application file for complete search history.

(56) References Cited

U.S. PATENT DOCUMENTS

2008/0004110 A1* 1/2008 Cortenraad ......... A63F 3/00643
463/34
2012/0062490 A1* 3/2012 Heatherly ............... A63F 13/02
345/173

(Continued)

FOREIGN PATENT DOCUMENTS

EP 1650645 A2 4/2006

OTHER PUBLICATIONS

Search Report of counterpart European Patent Application No. 15837744.0 dated Jan. 5, 2018.

*Primary Examiner* — Nelson Rosario
*Assistant Examiner* — Andrew Lee

(57) ABSTRACT

An interface device for a computerized system, the interface device including an engagement element configured for operable engagement with a region on a touchscreen of the computerized system to enable interfacing with the computerized system via the touchscreen, wherein the engagement element includes a viewing surface configured to allow a representation of content that is displayed at the region on the touchscreen with which the engagement element is operably engaged, to be visible through the viewing surface.

12 Claims, 5 Drawing Sheets

(51) Int. Cl.
*G06F 3/0354* (2013.01)
*G06T 13/00* (2011.01)
*G06T 13/40* (2011.01)
*G06F 3/039* (2013.01)
*A63F 13/20* (2014.01)
*A63F 13/245* (2014.01)
*A63F 13/213* (2014.01)
*A63F 13/426* (2014.01)
*A63F 13/2145* (2014.01)
*A63F 13/424* (2014.01)

(52) U.S. Cl.
CPC ........ *A63F 13/2145* (2014.09); *A63F 13/245* (2014.09); *A63F 13/424* (2014.09); *A63F 13/426* (2014.09); *G06F 3/039* (2013.01); *G06F 3/03543* (2013.01); *G06F 3/03545* (2013.01); *G06F 3/0488* (2013.01); *G06F 3/04883* (2013.01); *G06T 13/00* (2013.01); *G06T 13/40* (2013.01); *G06F 2203/04805* (2013.01); *G06F 2203/04809* (2013.01)

(56) References Cited

U.S. PATENT DOCUMENTS

2012/0262426 A1* 10/2012 Shi ...................... G06F 3/03545
345/179
2014/0024287 A1  1/2014 Mineur et al.

* cited by examiner

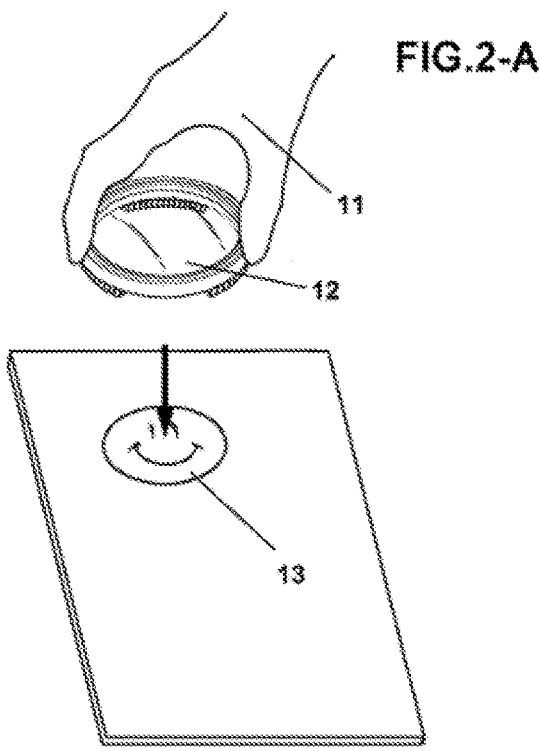
FIG. 2-A
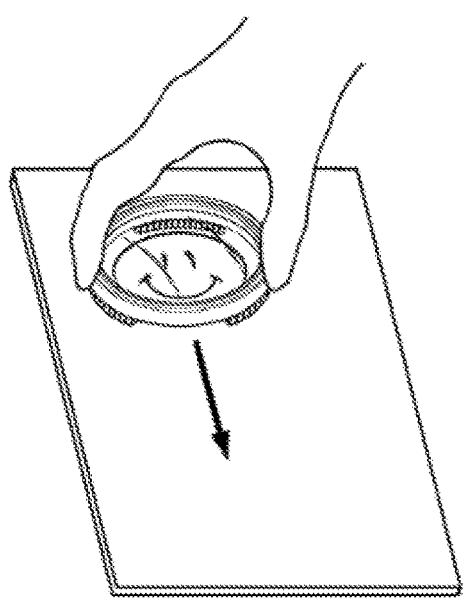
FIG. 2-B
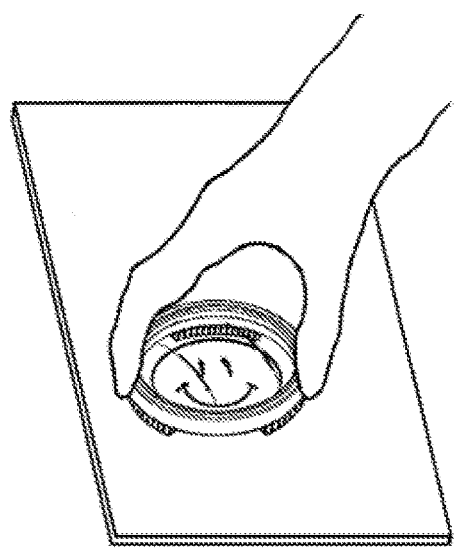
FIG. 2-C

HUMAN-COMPUTER INTERFACE DEVICE AND SYSTEM

TECHNICAL FIELD

The present invention relates to devices and systems for use in interfacing with a computerised system, and in particular, via a touchscreen interface of a computerised system.

BACKGROUND OF THE INVENTION

The term "Human Computer Interface" (HCI) is commonly used to refer to the means by which a user may interact with a computerised system. Examples of HCIs include output devices such as a monitor screens or printers, as well as input devices such as a keyboards, touchscreens, tablets, scanners, and/or a mouse.

One problem associated with touchscreen type HCIs is that when the user is interacting with the touchscreen by contacting a finger or stylus with the touchscreen, the user's view of content being displayed on the touchscreen tends to be occluded by the user's finger of stylus. These existing touchscreen HCIs do not have the capability to compensate for the occlusion of the content underneath the user's finger of stylus.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides an interface device for a computerised system, the interface device including an engagement element configured for operable engagement with a region on a touchscreen of the computerised system to enable interfacing with the computerised system via the touchscreen, wherein the engagement element includes a viewing surface configured to allow a representation of content that is displayed at the region on the touchscreen with which the engagement element is operably engaged, to foe visible through the viewing surface.

Preferably, the engagement element may includes at least one of a mouse and a stylus.

Preferably, the viewing surface may be substantially transparent.

Preferably, the viewing surface may be shaped to represent at least one of a gamepiece and a character.

Preferably, the viewing surface may include a lens.

Preferably, the content that is displayed at the region on the touchscreen may include at least one of a static image and a video stream.

Preferably, the representation of content that is displayed at the region of the touchscreen may include an animation.

Preferably, the representation of content may include an anthropomorphic character.

Preferably, the viewing surface may be configured such that representation of content displayed on the region of the touchscreen that is visible through the viewing surface is represented in three-dimensional form.

Preferably, the present invention may be configured such that an operational characteristic of the engagement element is able to be sensed by the computerised system and whereby the computerised system may be configured to control an output characteristic of the representation of content at the region on the touchscreen visible through the viewing surface in response to the sensed operational characteristic of the engagement element.

Preferably, the operational characteristic of the engagement element may include at least one of a type of the engagement element, a two-dimensional position/orientation of the engagement element relative to the touchscreen, a three-dimensional position/orientation of the engagement element relative to the touchscreen, and, a pattern of movement or a gesture of the engagement element relative to the touchscreen.

Preferably, the present invention may include a touch signalling array, wherein the operational characteristic of the engagement element may be sensed by the computerised system by reference to the touch signalling array.

In a second broad form, the present invention provides a human-computer interface system including:

a touchscreen configured for operable communication with a computerised system; and an engagement element configured such that under the control of a human, it is operably engageable with a region on the touchscreen to enable human interfacing with the computerised system via the touchscreen;

wherein the engagement element includes a viewing surface configured to allow a representation of content that is displayed at the region on the touchscreen with which the engagement element is operably engaged, to be visible through the viewing surface.

Preferably, the engagement element may include at least one of a mouse and a stylus.

Preferably, the viewing surface may be substantially transparent.

Preferably, the viewing surface may be shaped to represent at least one of a gamepiece and a character.

Preferably, the viewing surface may include a lens.

Preferably, the representation of content that is displayed at the region on the touchscreen may include at least one of a static image and a video stream.

Preferably, the representation of content may include an animation.

Preferably, the representation of content may include an anthropomorphic character.

Preferably, the viewing surface may be configured such that the representation of content displayed on the region of the touchscreen that is visible through the viewing surface may be represented in three-dimensional form.

Preferably, the present invention may be configured such that an operational characteristic of the engagement element may be sensed by the touchscreen and whereby the touchscreen is configured to control an output characteristic of the representation of content at the region on the touchscreen that is visible through the viewing surface in response to the sensed operational characteristic of the engagement element.

Preferably, the operational characteristic of the engagement element may include at least one of a type of the engagement element a two-dimensional position/orientation of the engagement element relative to the touchscreen, a three-dimensional position/orientation of the engagement element relative to the touchscreen, and, a pattern of movement or a gesture of the engagement element relative to the touchscreen.

Preferably, the present inventions may include a touch signalling array wherein the operational characteristic of the engagement element may be sensed by the touchscreen by reference to the touch signalling array.

Preferably, the present invention may be configured for use as at least one of an automated assistant for a human, an advertising medium, a therapy tool, an educational medium, a toy, an entertainment medium, and a gamin medium.

In a third broad form the present invention provides a robot for use with a touchscreen of a computerised system, the robot including:

a positioning mechanism configured for positioning the robot at regions of the touchscreen;

an engagement element configured to operably engage with the touchscreen, an operational characteristic of the robot being configured for sensing by a sensor of the computerised system when the engagement element is operably engaged with the touchscreen; and a processing module;

wherein in response to the sensed operational characteristic of the robot, the processing module is configure to perform at least one of:

(a) controlling the robot to perform an action by reference to the sensed operational characteristic of the robot; and (b) displaying a predetermined content on the touchscreen by reference to the sensed operational characteristic of the robot.

Preferably, robot may include a representation of a character such as a pet dog or a chess piece.

Preferably, the operational characteristic of the robot may include at least one of a type of the robot, and, a position/orientation of the robot relative to the touchscreen.

Preferably, the processing module may include at least one of a smartphone and the touchscreen.

Preferably, the robot may include a viewing surface via which a representation of content displayed at a region of the touchscreen with which the robot is operably engaged is visible through the viewing surface.

Preferably, the present invention may include a sensor for sensing the operational characteristic of the robot by reference to a capacitive touchpad disposed on the robot which is configured to operably engage with a touch sensor array of the touchscreen.

Preferably, the computerised system may be configured to control an action of the robot and to display content on the touchscreen which may simulate an interaction between the robot and the content displayed on the touchscreen.

Preferably, the computerised system may be configured to sense a position/orientation of human user, and, in response to the sensed position/orientation of the human user, control the robot to move toward the human user and/or perform a greeting.

In a fourth broad form, the present invention provides a human-computer interface system comprising:

(a) at least one separable lens operable to transmit light from a touchscreen through said lens, (b) at least one feature attached to said lens operable to be sensed by a touchscreen.

Preferably, the present invention may include:

(a) a first set of software instructions operable to receive and process input from the at least one feature attached to said lens, to estimate at least some state of said lens, (b) a second set of software instructions operable to determine a response to the output of said first set of software instructions.

Preferably, at least some portion of said response may be operable to control animation of at least one image on a touchscreen.

Preferably, at least some portion of an animation may be transmitted through the lens.

Preferably, the present invention may include software operable to control animation that resembles at least some human nonverbal communications.

Preferably, the present invention may further include at least one stylus attached or attachable to the TLM.

Preferably, the present invention may further include a form of at least one lens, operable to provide a three-dimensional shape to an image transmitted through the lens.

Preferably, the present invention may further include a set of software instructions operable to detect at least one pattern in a TLM, and thereby identify or estimate at least one of the following: a particular TLM or type of TLM, the orientation of a TLM, the 3D position of a TLM, other particular states of the TLM, and/or state(s) of user of the TLM.

Preferably, the present invention may further include a lens shaped into a gamepiece.

Preferably, the lens may be shaped into a character.

Preferably, the present invention may further include a means operable to detect particular gestural actions of a TLM.

Typically, the present invention may function as an interface between at least one human and at least one computer.

Typically, the present invention may function as an interface between at feast one human and at least one computer network.

Typically, the present invention may function as en automated assistant to humans.

Typically, the present invention may function as an advertising medium.

Typically, the present invention may function as a therapy tool.

Typically, the present invention may function as a tool for education.

Typically, the present invention may function as a toy.

Typically, the present invention may function as an entertainment medium.

Typically, the present invention may function as a gaming medium.

In a fifth broad form, the present invention provides a machine for human-computer interface, including:

(a) a separable lens with features operable to send input into a touchscreen, (b) animation operable to respond to the action of said features.

Preferably, at least some portion of said animation may resemble at least some portion of an anthropomorphic character.

Preferably, the present invention may further include elements operable to transmit the animation through the lens.

Preferably the animation may represent information or data.

Typically, the present invention may function as an advertising medium.

Typically, the present invention may function as a tool for education.

Typically, the present invention may function as a toy.

Typically, the present invention may function as an entertainment medium.

Preferably, the present invention may further include a lens shaped into a gamepiece.

Preferably, the present invention may further include a lens shaped into a character.

Preferably, the present invention may further include a lens, operable as a display.

In another broad form of the present invention, a human computer interface system is provided including separable lens hardware operable to be touched onto a screen and sensed by a touchscreen, and a sensor operable to register the position of the lens hardware under the control of computational system. The system may comprise a first set of software instructions operable to receive and process input from a sensor in response to a lens to determine the position and orientation of said tens upon a screen display. The system may also comprise a second set of software instructions operable to determine a response to a position of a lens, whereby the computational system shall output signals corresponding to the response, such that, in at least some instances, the output signals control the animation of an image under the lens.

The present invention may assist in providing several important technical advantages. Embodiments of the invention may have none, some, or all of these technical advantages without departing from the scope of the invention. The present invention may provide a more naturalistic mechanism for people to interact with various electronic devices. By providing a transparent lens as a stylus or mouse, the invention facilitates the display of the image under a mouse, which otherwise may be occluded by the mouse. Another important technical advantage is that the present invention may assist in the display of changing information in an image under the tens to a human with which a computer is interacting to better facilitate interaction between the computer and a human.

BRIEF DESCRIPTION OF THE DRAWINGS

The present invention will become more fully understood from the following detailed description of a preferred but non-limiting embodiment thereof, described in connection with the accompanying drawings, wherein:

FIG. 2 illustrates examples of use of the TLM embodiment in combination with a touchscreen;

DETAILED DESCRIPTION OF THE PREFERRED EMBODIMENTS

Figure 1:
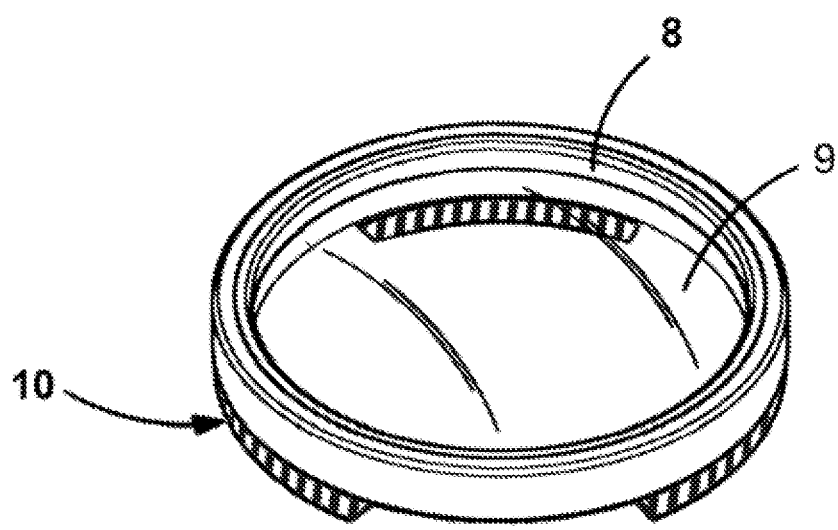
FIG. 1 illustrates one embodiment of the present invention as a "touch lens mouse" (TLM)

Preferred embodiments of the present invention and its advantages will now be described herein by reference to FIGS. 1 to 5 of the drawings, like numerals being used for like and corresponding parts of the various drawings.

One aspect of the invention is an HCI system called a Touch Lens Mouse (TLM), comprising a substantially transparent lens with features that produce multi-touch signals when touching or near to a touchscreen, in order to generate human-computer interactions that may be more enjoyable, intelligible and/or informative to humans than previous HCI systems. One possible means for a TLM to be sensed by a touchscreen may include a Touch Signaling Array (ISA), which comprises a set of elements made to signal a touch detector with a controlled set of touch points that are composed of any suitable material such as rubber and/or metal that is embedded within or otherwise attached to the lens or mouse-like object, operable to transmit signal to a touch-detecting surface and/or field; such TSA may be arranged in signature configurations that are mutually distinguishable, so as to identify a given TSA relative to another, and to signal the orientation of a TSA as well in position.

In one embodiment, a TLM comprises apparatus and/or software for a TLM to transmit at least some gestural non-verbal human communication signals, apparatus and/or software for a TLM to decide meaningful responses to sensory perceptions, and apparatus and/or software for a TLM to display responses to human input using a TLM. To sense and perceive natural human communication signals, the TLM may employ (without limitation) touch-tracking, multitouch sensing, and pattern recognition. Other hardware and/or software systems may also be used. To decide meaningful responses to sensory perceptions, the TLM may employ any, all, or none of Expert Knowledge Systems, logical reasoning systems, and/or statistical reasoning systems. Other related systems may also be used. To display communicative output, the TLM may employ animation such as (but not limited to) face animation that is humanlike in appearance, facial expressions, and/or gestures, under a TLM lens and transmitted up through the TLM lens to affect a 3-dimensional display via the TLM lens.

A TLM may be advanced by the coordinated integration of other display for other output) technology in addition to said animated character or other display in the TLM. In some embodiments, this additional output technology may supplement the naturalistic communication with conventional computer graphics and text, sound, etc. Technology that produces various smells may also be used. Technology that produces tactile sensations may also be used. Technology that produces bodily gestures and/or locomotion may also be used.

The description below presents many other options that may be associated with the TLM of the invention. The description below also presents a number of other structures, methods, compositions of matter, etc., each of which may constitute a separate invention.

Before describing the drawings in more detail, the following description will provide some additional overview information concerning various embodiments and aspects of the invention disclosed herein. The description below discusses various options for various aspects of the TLM and its use. Nothing herein is intended to be essential to the invention or limit the invention in some way not specified in the claims of any issued patent based upon this description.

Organisms, characters, robots, and/or other beings may be simulated in a TLM system by using animation of any suitable variety shown with the TLM system; here and hereafter "animation" shall refer to the animated emulation of visible behavior of (a) being(s) including but not limited to: skin, fur, flesh, feathers and/or similar. Any suitable display technology (such as, for example but not limited to: lcd, tft, plasma, led, oled, hologram, and/or back-projection) may be used anywhere a display is described this patent, and anywhere a display is used in TLM systems. All displays described in use in this patent may be touchscreen, although they are not required to be so.

The invention may also include a mechanical system for achieving conductive multi-touch via a lens or mouse-like object, and shall hereafter be called "Touch Signaling Array". Touch Signaling Array or TSA comprises a set of elements made to signal a touch detector with a controlled set of touch points that are composed of any suitable material such as rubber and/or metal that is embedded within or otherwise attached to the lens or mouse-like object, operable to transmit signal to a touch-detecting surface and/or field.

The present invention also relates to several embodiments of Touch Signaling Array which effectuate particular multitouch gestures. One embodiment of the Touch Signaling Array may emulate the appearance of the dynamical pattern of multiple human fingers, simulating action similar to that of the human multi-touch input, to control information input into a computing system.

Another aspect of the invention may include embodiments of a Touch Lens Mouse, such as may or may not be used in applications including but not limited to board games, display and control of virtual characters, vehicle control systems, controls of environments, and/or control of robots.

Another aspect of the invention may include embodiments of a Touch Lens Mouse, such as may or may not be used as a general purpose means for browsing, navigating, and/or modifying information on a computer and/or a computer network (such as but not limited to: the web, cloud, intranet, and/or cellular network), such that interaction with the TLM system may provide a more engaging and high-bandwidth information exchange than some alternative HCI. In these cases, the TLM may be used for one, some, all or none of the following: (a) to display information through the TLM lens, (b) to allow manipulation of information represented by icon(s), symbol(s), and/or character(s) using the visual and gestural aspects of the TLM, (c) to obtain data from the human user by gesture, manipulation of the TLM, tactile sensing, and/or accessing data relating to the user, and integrating these data into models of a user's cognitive, emotional, and/or social state, (d) to perform diagnosis and assessment of the user's data, by using expert systems database(s), big data analytics, and/or reasoning systems that may or may not be based upon standard knowledge of cognition and psychology, (e) to use naturalistic display through the TLM and synchronized verbalizations to deliver gestures, knowledge, information, entertainment, education, advertising, and/or help, (f) to help assess a user's behavior, developmental performance, and progress at goals, (g) to perform any other display(s) of information or characters, or to allow any other manipulation(s) of information that are either currently performed by other HCI and/or related computing systems or that may otherwise be served by TLM systems.

Embodiments of a TLM may be used as a developmental nurturing tool such as an educational play object, educational toy or play device, and/or a developmental therapy device, such that interaction with said tool may provide healthful developmental and/or entertainment benefits to children. In these cases, the TLM may be used for one, some, all or none of the following: (a) to provide nurturing, educational, and/or entertaining interaction with a child via character(s) displayed under the TLM lens(es), (b) to maintain the attention of the child, by varied means that may include games, caring for a virtual pet or other character displayed through the TLM, and/or storytelling, to a naturalistic display and verbalizations to deliver knowledge, encouragement, assignments, and/or commands/suggestions for behavior changes to the child, (c) to obtain data from the child by gesture, visual inspection, tactile sensing, and/or accessing data relating to the child, (d) to perform diagnosis and assessment of the child's data, by using expert systems database(s), big data analytics, and reasoning systems that may or may not be based upon standard knowledge of pedagogy and developmental psychology (e) to therapeutically and/or educationally influence the child with interactions, utterances, and/or gestures, and/or to socialize the child, (f) to provide assessments of a child's behavior, developmental performance, and progress to parents, medical personnel, and/or educators (g) to perform any other display(s) of information or characters, or to allow any other manipulation(s) of information that are either currently performed by other HCI, toys, and/or related computing systems or that may otherwise be served by TLM systems.

Embodiments of a TLM may be used as toys such as games, game pieces, action figures, dolls, novelties, simulated animals, and/or display devices for video games. In these cases, the TLM may be used for one, some, all or none of the following: (a) to maintain the attention of the user, by varied means that may include games, interactive dialogue, interaction with a virtual pet or other character displayed through the TLM, and/or storytelling, and verbalizations to deliver knowledge, encouragement, assignments, and/or commands/suggestions for behavior changes to the user, (c) to obtain data from the user by gesture, TLM input, visual inspection, tactile sensing, accessing data relating to the user, or any other means, (d) to perform diagnosis and assessment of the user's data, by using expert systems database(s), big data analytics, intelligent systems, and/or any other means, (e) to influence the user with interactions, utterances, and/or gestures, (f) to compile and present assessments of a user's state(s), behavior, developmental performance, and progress (g) to perform any other display(s) of information or characters, or to allow any other manipulation(s) of information that are either currently performed by other HCI, toys, and/or related computing systems or that may otherwise be served by TLM systems, (h) to connect into a computer network for multi-user games, and/or to access additional knowledge and/or data for enhanced playful function.

Embodiments of a TLM may be used as an artistic control including without limitation digital sculpture input, CAD control, music authoring, film editing, control of automated theater, and/or automated architectural spaces. In these cases, the TLM may be used for one, some, all or none of the following: (a) to provide aesthetic, cultural, and/or narrative expression for an artist or artists, (b) to maintain the attention of the viewer by varied means that may include games, linguistic interaction, performance, automated environmental changes, and/or storytelling, (c) to obtain data from a person or people by TLM interaction (d) to assess said data by some means, (e) to determine responses, (f) to use naturalistic display, verbalizations, and automated environmental changes, to deliver sensory impressions to the viewer, with the effective of cultural or psychoactive effect, (f) to provide recordings and assessments of people's response to the artwork for a supplement to the artwork, for historical posterity, and/or for scientific evaluations, (g) to perform any other services that may be automated that are currently performed by mouse or stylus or display or character or artforms.

While the above description has provided various options for implementing a TLM and various applications of a TLM, the described TLM may omit some or all of the described applications, and/or mechanical, electronic, electro-mechanical, software, and other systems without departing from the scope of the invention. Other systems could be substituted for those disclosed. Other applications could be substituted for those disclosed. While various applications of a TLM have been described, the TLM could be used for other applications without departing from the scope of the invention. While a TLM could have a capability to perform all of the applications described herein, it might also perform none, some, or other functions without departing from the scope of the invention. It will further be understood by those skilled in the art that descriptions of mechanical systems above may include electronic, electromechanical, and biological components. Such systems may involve computer software as well.

FIG. 1 illustrates one embodiment of a Touch Lens Mouse, including a conductive element 8, a light-transmissible lens 9 and insulating elements 10 that together act as a TSA.

Figure 4:
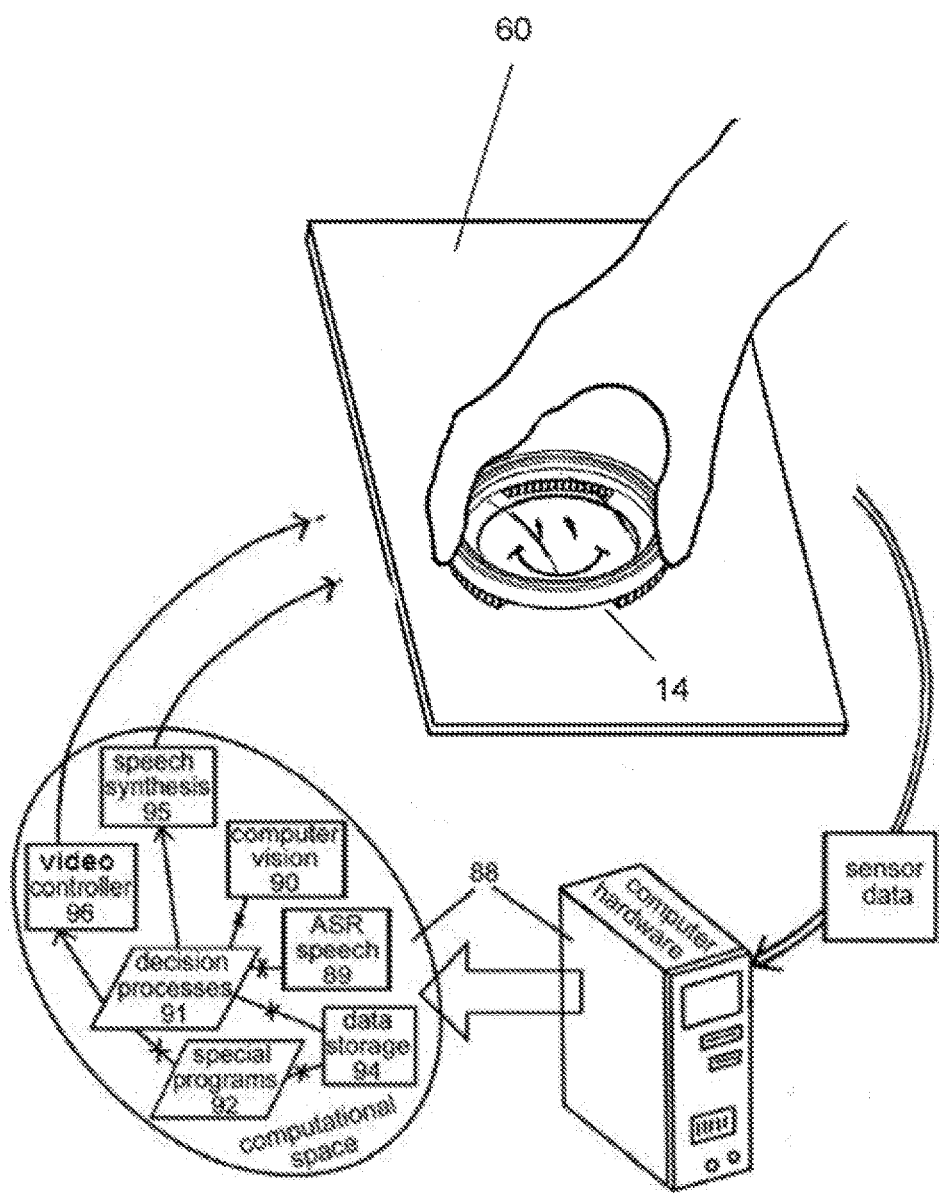
FIG. 4 is a block diagram illustrating one embodiment of a control system configuration that may be used to achieve control using a TLM.

FIG. 2 illustrates one embodiment of a Touch Lens Mouse, wherein a human user 11 places a TLM 12 onto a touchscreen with displayed imagery 13, showing the touchscreen imagery through the TLM lens 12, and showing the imagery manipulated by the TLM to a new position 14 as shown in FIG. 4.

Figure 3:
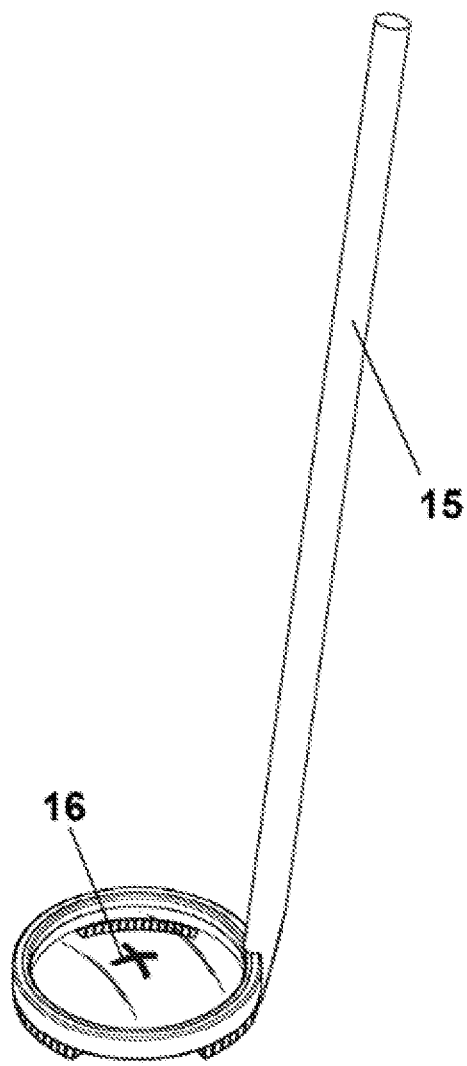
FIG. 3 illustrates another embodiment of the present invention in which a TLM is shown as a mouse with cross hairs, to show position, and clicking methods.

FIG. 3 illustrates one embodiment of a Touch Lens Mouse, wherein a TLM has a handle 15 which allows the TLM to function as a stylus, and cross hairs 16 marked on the TLM lens allow a user to more accurately target a subject in a touchscreen display environment.

Figure 5:
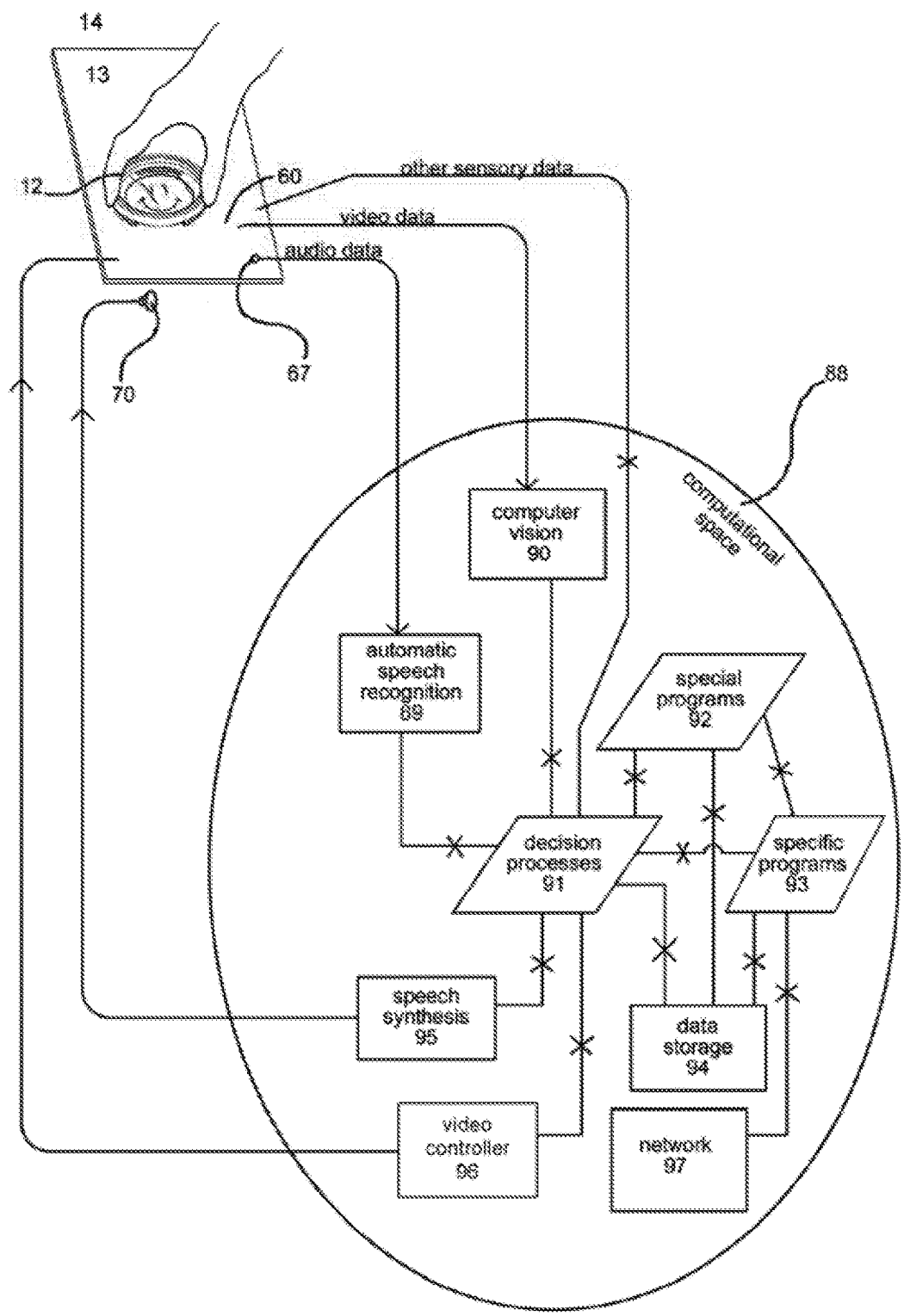
FIG. 5 is a block diagram illustrating an embodiment in the form of a TLM being used to access, navigate, or modify the information present on a computer network.

FIG. 4 is a block diagram illustrating one embodiment of a TLM system configuration that may be used to illustrate one embodiment, including a TLM mouse on a touchscreen 60, and an electronic control system 88 that governs the operation of various mechanisms in order to achieve at least some input into computer using the TLM TSA to affect control of data in the computer, and achieve controlled output from the control system, such as changes in imagery on the touchscreen. Data may be sent from the TLM sensors to a computer by any suitable communications medium, including without limitation wires and/or a wireless link. The same or separate communication link(s) could be used for both inputs and outputs and multiple communication links could be used without departing from the scope of the invention. Sensor data may be relayed into a computational system 88, which in the figure comprises a computer and various software(s), but could exist within microcontroller(s), a computer network, cellular phone, tablet, or any other computational hardware and/or software. The functions performed by computational system 88 could also be performed in whole or in part by special purpose hardware. Although the computational system 88 is portrayed in FIG. 4 as existing externally to the TLM, alternatively the computational system 88 may be partially or entirely enclosed within the TLM without departing from the scope of the invention. Automatic Speech Recognition (ASR) 89, may process related audio data to detect speech and extracts words and low-level linguistic meaning. Computer Vision 90 may perform any of various visual perception tasks using the video date, such as, for example, the detection of human emotion or TLM mouse motion. Decision processes 91 may determine appropriate communicative responses and other behaviors based upon the input received. Special Programs 92 may be used to enhance the functionality of the system. Specific Programs 93 is other software that is accessed by the TLM. Data storage 94 affects long term memory, builds knowledge, and stores software. Speech or other auditory responses may be produced by any suitable speech synthesis software 95 and made audible using an audio transducer. Any suitable video controller 96 may be used to control animations to effectuate display actions in the TLM, such as but not limited to animation of a character. Some or all of the components of computational system 88 could be omitted or other components added without departing from the scope of the invention. With respect to the software modules FIG. 5 shows more specifically what each is doing, and describes commercially available, off-the-shelf options for each. While in the described embodiments, sensors are described as being placed within the TLM system, TLM devices do not require any of the sensing elements (which may include, any, all, none of, or others-other-than the following: video cameras, microphones, olfactory sensors, touch sensors, velocity sensors, accelerometers, and/or positioning sensors) to be integral to the TLM. Any and/or all sensors may be placed in other locations external to the TLM (or in other locations within the TLM than are described herein) without changing the scope of the invention. Additionally, other sensors may or may not be utilized as desired, such as, for example, bar-code scanners, infrared sensors, ultra-sound sensors, echo-location sensors, touch sensors, velocity sensors, accelerometers, positioning sensors, fingerprint scanners, retinal scanners, sphygmomanometers, pulse detectors, EEG detectors, terahertz imaging devices, magnetic resonance imaging devices, ground penetrating radar, skin current detectors, and/or any suitable other sensing, perception, or data-gathering and analysis instrumentation and technologies. A TLM may or may not also access data from external sensors, potentially including sensors contained within other devices (such as, for example, weather stations, automobile sensors, "smart dust" sensors, robots, and/or other TLM devices), via any suitable means of data transmission, such as, for example, a computational network.

FIG. 5 is a block diagram illustrating one embodiment of a control system configuration that may be used to emulate at least some human-computer interface and optional human-human communication in a TLM system. In the depicted embodiment, a tablet 60 with touch screen, video sensor and audio sensor 67 in a TLM interface 13, respond to a human user moving a TSA 12, to transmit touch data, and optionally: related video and audio data, into a computational system 88. One set of software and/or embedded hardware processes running in the computational space, called Automatic Speech Recognition (ASR) 89, processes the audio data to detect speech and extracts words and low-level linguistic meaning. Any suitable software may be used to accomplish ASR, including various available systems, such as, for example, Sphinx from Carnegie Mellon University or Nuance Dragon. Another set of software and/or embedded hardware processes called Computer Vision 90 may perform any of various visual perception tasks using the video data. Such visual perception tasks may include the detection and tracking of the faces of people, using any suitable software, which may include various available software, such as, for example, Intel's Open Computer Vision library or Microsoft's Kinect SDK. Other visual perception processes may also include the tracking of facial features or expressions on the faces of people and any suitable software may be used for this task, such as, for example, Google's face perception software. Decision processes 91 may be used to determine appropriate communicative responses and other behaviors and any suitable software may be used for this purpose such as, game engines, for example JMonkey or Unreal, or conversational engines for example: any of the public or commercially available "chatbot" software, like "Eliza" and "Alice." Alternatively, those skilled in the art may create software specific to the applications described above to implement the claimed invention. Other processes called special programs 92 may be any off-the-shelf or custom software that may be bundled with the TLM that include functions that enhance the TLM for specific applications are not included in standard software, such as, for example: software that monitors vital functions in a patient, software that detects presence of chemical danger, and/or software that set off fire alarms or burglar alarms. Other processes called specific programs 93 may be used to enhance the functionality of the system in other ways. These specific programs 93 may be any off-the-shelf software that may be accessed by the TLM, wherein the TLM becomes a layer through which a user interacts with the specific programs; such software may include any, all, or none of the following: spreadsheet software, web-browsing software, email programs, word processing software, electronic books, expert systems, Artificial Intelligence software, mathematical software, geo-positioning software, and/or game software. Data storage 94 may be used to affect a long-term memory, build knowledge, and to store software. Speech responses may be synthesized by any suitable speech synthesis software 95 such as, for example, the open-source software "Festival", to be made audible using an audio transducer 70. Any suitable video controller 96 may be used to effectuate non-verbal expressions in the TLM 12. Non-verbal responses may operate independent of speech (in one embodiment, by direct mimicry), or in synchrony with the content of the synthesized speech.

The following section discusses low of data through one embodiment of a TLM control system. The touchscreen 60 in the TLM 13 may respond to gestural action of the TSA 12 to send signals into the computational space 88, which estimate state(s) of TSA 12 such as for example: position, orientation, trajectory, proximity, and/or pressure on a touchscreen. The data regarding the state(s) of this TSA may be sent on to decision processes 91, which may decide to react to TSA signal, based on variables that govern the TLM system decisions. If the TLM decides to react to a perceived person, data may be sent to video controller 96 regarding the anticipated position of the TLM under control of a person. Video control signals may travel to touchscreen 60 in the TLM interface 13 that control animation position and other variables, to make the animation track the perceived TSA, so that the animation may appear to be part of the TLM, and so that the animation may appear when the TLM comes close to the touchscreen, and to disappear when the TLM lifts away from the touchscreen, thereby creating the illusion that the animation is actually produced within the lens. Decision processes 91 may also send a signal to video controller 96 to affect a smile of greeting; video controller 96 may generate and send appropriate the signals to the animation to simulate eating or fighting or other character behaviors. Decision processes 91 may also send the signal to speech synthesis 95 to utter a greeting. Speech synthesis 95 may generate the corresponding speech greeting signal, and send this signal to an audio transducer 70 in the TLM to make the signal audible to a person. Upon these greeting gestures, the person may return greeting, and then request if any new email messages have been sent for the person. The microphones in the TLM may detect the speech data, transmit the data to ASR 89, which may decipher the words, and may decipher some linguistic content. The resulting language analysis will be relayed to decision processes, which may further decipher the linguistic content, to understand the person's request. Decision processes may summon special programs 92 dedicated to personal assistant functions, to translate the request for email into appropriate web-browsing functions. Special programs 92 may then send signals to specific programs 93, which open the appropriate servers and URLs on the Internet over the network 97, to open the person's email account. Special programs 92 then decipher the hypertext of the messages to determine what email messages are new, and returns this data to decision processes 91, which puts the information into natural language, which is relayed to speech synthesis 95, which then generates speech signals that are relayed to the audio transducer 70 in the TLM. The transmission of this audible signal completes the control loop. During the described transactions, all data may be relayed from decision processes, special programs, and specific programs, to data storage 94, where it may be recorded for future reference as needed. Data storage 94 may also serve to store software that is not actively used, to be summoned into active duty as needed, to conserve processing resources.

Herein a Touch Lens Mouse may also be used to access, navigate, or modify the information present on a computer network 97, wherein said computer connects to a computer network 97 in such a way that said computer can access data present in other computers; this data is then translated into emulated natural animation for transmission through the touchscreen 60. The TLM could serve as an interface to a virtual personal assistant, by displaying such an assistant through the lens, and performing helpful functions in response to natural dialogue and TSA gestures from the user. The TLM could serve as an alternative display for various computer-generated characters (the TLM being three-dimensional and emphasized within the TLM lens as opposed to "virtual" imagery on a display screen) for animated agents, "chatterbots" or avatars. In one such embodiment, the TLM could serve as an interface to a video game, such that the TLM represents a controller and a 3D display for the video-game character, and in so doing, the character appears to exist outside of the game, in our physically-embodied world, thus enhancing the experience of the videogame user, and opening many new possibilities in video-game design.

In alternative embodiments of the present invention a computerised system is provided comprising a touchscreen (such as a Tablet or IPAD) and a robot (for instance a two-motor robot) which is suitably sized and dimensioned to operably engage with and move across a surface of the touchscreen under remote wireless control. A camera is operably connected to the touchscreen and a position of the human user is able to be determined relative to the touchscreen by reference to images captured by the camera.

The robot includes a positioning mechanism configured to allow positioning of the robot across the surface of the touchscreen. The positioning mechanism could include a wheel assembly, a tractor engagement mechanism, a sliding engagement mechanism and so on.

The robot includes capacitive touchpads disposed on an underside surface which are configured to be sensed by a sensor array disposed on the touchscreen as the robot operably engages with the touchscreen so as to provide position/orientation information of the robot relative to the touchscreen surface at any given time. The capacitive touchpads also provide other information indicative of operational characteristics of the robot which are sensed by the touchscreen. For instance, the capacitive touch pads pattern could be fabricated on the robot in a specific and unique pattern which is indicative of a specific type or identity of the robot that is in interacting with the touchscreen. Upon sensing each specific and unique capacitive array pattern and recognizing the specific type or identity of the robot by use of a detection algorithm, the touchscreen is configured to initiate a particular response or series of responses which are matched to the identity of the robot. The specific and unique patterns could be used to distinguish between robots shaped and craft to resemble different types of chess pieces, different types of animals, different types of pets etc. One robot could for instance have 3 capacitive touchpads arranged in a triangular pattern with sides of length 3 mm, 3 mm and 5 mm whilst another robot could have 3 capacitive touchpads arranged in a triangular pattern with sides of length 4 mm, 4 mm and 3 mm.

In one example, in response to a sensed position/orientation of the robot and the human user, the touchscreen could be configured to transmit a wireless control signal to the robot to instruct the robot to move towards the position of the human user, and, transmit a further wireless control signal to the robot to perform a greeting for the human user. Alternatively, a smartphone or other computing device could be used to wirelessly transmit control signals to the robot to control movement and operating characteristics of the robot. In a further example, the robot could represent a pet dog whereby, in response to a sensed position/orientation of the pet dog robot and a human user, the touchscreen could be configured to display content on the touchscreen and/or wireless transmit movement control signals to the robot which cause the robot to interact with the content on the touchscreen and/or with the human user. For instance, upon identifying the robot as being a "pet dog", the touchscreen could generate content representing a dog dish in a kitchen scene. The touchscreen is configured to then wirelessly transmit a control signal to the pet dog robot whereby the robot whines, moves toward the dog dish, scratches at the dog dish, and turns to look at the human user's position to beg for food. The touchscreen is further configured to receive and process human user finger gestures via the touchscreen which may cause a representation of a bag of dog food to be displayed on the touchscreen which the human user may then drag towards the image of the dog dish with his/her fingertip to fill the dog dish. The touchscreen may be further configured such that when the image of the dog food bag touches the image of the dog dish, a video of dog food pouring from the bag into the dog dish appears. Thereafter the touchscreen is configured to transmit a control signal to the dog robot which causes it to perform a happy dance before eating the food, while making happy sounds and turning to look thankfully at the position of the human user.

In another example, in response to sensed positioning/orientation information or other sensed operational characteristics of the dog robot, the touchscreen could be configured to generate content representing a toy and whereby the touchscreen is configured to transmit a control signal to the pet dog robot causing the pet dog robot to simulate movement of dragging the representation of the toy across the touchscreen surface towards the human user. The touchscreen is further configured to receive and process human user instructions in the form of finger gestures entered via the touchscreen whereby the toy is able to wrestle the toy from the pet dog robot and cause the image of the toy displayed on the touchscreen to appear to be "thrown" across the touchscreen. In response to the image of the toy being "thrown" across the touchscreen, the touchscreen is configured to transmit a control signal to the pet dog robot to move across the touchscreen in a manner which is indicative of the pet dog robot fetching the toy and returning it to the human user.

In certain embodiments of the present invention, the robot also includes a TLM-type lens such that a representation of content displayed on the touchscreen is able to be projected up through the TLM-type tens in three-dimensional form.

Embodiments of the present invention may be capable of providing physically embodied computer animation. That is, content displayed on the touchscreen in the form of animation may be represented by a robot operably engaged with the touchscreen which is able to physically move about the touchscreen and to physically embody facial expressions representing the animation content displayed on the touchscreen. The cost in implementing physically embodied animators is reduced by use of robots with dedicated computing and by wirelessly controlling the robot from external (to the robot), general-purpose computing such as cellphones, PCs or cloud. Advantageously, the use of curved or flexible screen displays with such robots nay assist in displaying facial expressions or other imagery.

In certain embodiments, parts of the robots used in these embodiments such as the body, head, and legs may be sold separately and assembled in modular form by the user which has the advantage of providing a more personalised user experience.

Although the present invention has been described in detail, it should be understood that various changes, substitutions and alterations can be made hereto without departing from the sphere and scope of the invention as defined by the appended claims.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention in broadly hereinbefore described. It is to be understood that the invention includes all such variations and modifications. The invention also includes all of the steps and features, referred or indicated in the specification. Individually or collectively, and any and all combinations of any two or more of said steps or features.

The reference to any prior art in this specification is not, and should not be taken as, an acknowledgment or any form of suggestion that that prior art forms part of the common general knowledge.

To aid the patent office, and any readers of any patent issued on this application in interpreting the claims appended hereto, applicants wish to note that they do not intend any of the appended claims to invoke paragraph 6 of 35 U.S.C. § 112 as it exists on the date of filing hereof unless "means for" or "step for" are used in the particular claim.

What is claimed is:

1. An interface device for a computerised system, the interface device including an engagement element configured for operable engagement with a region on a touchscreen of the computerised system to enable interfacing with the computerised system via the touchscreen, wherein the engagement element includes a viewing surface configured to allow a representation of content that is displayed at the region on the touchscreen with which the engagement element is operably engaged, to be visible through the viewing surface; wherein the engagement element comprises a conductive element, a light-transmissible lens, insulating elements, a handle which allows the engagement element to function as a stylus, and cross hairs marked on the lens allow a user to more accurately target a subject in the touchscreen.

2. The interface device as claimed in claim 1 wherein the engagement element includes at least one of a mouse and a stylus.

3. The interface device as claimed in claim 1 wherein the viewing surface is substantially transparent.

4. The interface device as claimed in claim 1 wherein the viewing surface is shaped to represent at least one of a gamepiece and a character.

5. The interface device as claimed in claim 1 wherein the viewing surface includes a lens.

6. The interface device as claimed in claim 1 wherein the representation of content that is displayed at the region on the touchscreen includes at least one of a static image and a video stream.

7. The interface device as claimed in claim 1 wherein the representation of content that is displayed at the region of the touchscreen includes an animation.

8. The interface device as claimed in claim 1 wherein the representation of content includes an anthropomorphic character.

9. The interface device as claimed in claim 1 wherein the viewing surface is configured such that representation of content displayed on the region of the touchscreen that is visible through the viewing surface is represented in three-dimensional form.

10. The interface device as claimed in claim 1 configured such that an operational characteristic of the engagement element is able to be sensed by the computerised system and whereby the computerised system is configured to control an output characteristic of the representation of content at the region on the touchscreen visible through the viewing surface in response to the sensed operational characteristic of the engagement element.

11. The interface device as claimed in claim 10 wherein the operational characteristic of the engagement element includes at least one of a type of the engagement element, a two-dimensional position/orientation of the engagement element relative to the touchscreen, a three-dimensional position/orientation of the engagement element relative to the touchscreen, and, a pattern of movement or a gesture of the engagement element relative to the touchscreen.

12. The interface device as claimed in claim 10 including a touch signalling array, wherein the operational characteristic of the engagement element is able to be sensed by the computerised system by reference to the touch signalling array.

* * * * *